United States Patent Office

3,105,008
Patented Sept. 24, 1963

3,105,008
TETRACYCLINE FORMULATIONS
Murray A. Kaplan, Syracuse, and Frank H. Buckwalter, Dewitt, N.Y., assignors, by mesne assignments, to Bristol-Myers Company, New York, N.Y., a corporation of Delaware
No Drawing. Filed Mar. 20, 1958, Ser. No. 722,637
2 Claims. (Cl. 167—65)

This invention relates to certain improved formulations of the broad spectrum antibiotic tetracycline and, more particularly, to aqueous solutions comprising amphoteric tetracycline and particular amounts of calcium hydroxide, said solutions being free of inorganic anions and having a pH in the range of 9–11.

For many purposes, i.e. administration to children and the aged, the physician would prefer to use a true aqueous solution of an antibiotic and, of course, as a practical matter, it is preferable that this solution be stable under ordinary conditions of storage and without refrigeration for periods of at least one year. In the field of orally administered antibiotics it is well known that no such preparation of any antibiotic has ever been provided. Thus, in the tetracycline field previous oral formulations have either been nonaqueous or have been suspensions with their attendant problems of settling and difficulty of dispensing accurate dosage, or have been dry mixtures which must be reconstituted before use and then retain their biological activity only for limited periods of time, such as one week, and in addition do not remain as true solutions but on the contrary soon form precipitates which render them unsatisfactory for use.

It is the object of the present invention to provide true aqueous solutions of tetracycline suitable for oral administration which remain stable and remain true solutions for periods of at least one year at room temperature and which further provide in normal dosage, e.g. one or two teaspoonfuls q.i.d., satisfactory therapeutic blood levels of tetracycline upon oral administration.

In the past the main use of tetracycline has been in the form of amphoteric tetracycline, also called tetracycline base, tetracycline hydrochloride or tetracycline phosphate complex. Use has also been made to a small extent of aqueous suspensions of calcium tetracycline, but these have now been abandoned as relatively unsatisfactory. Considerable evidence has been accumulated to show that calcium ions antagonize the antibacterial activity of tetracycline and that this effect is exhibited when salts, innocuous per se, such as dicalcium phosphate are added to tetracycline even in small amounts as fillers (see Dearborn et al., Antibiotic Medicine and Clinical Therapy, IV (10), 627–641, 1957; Sweeney, et al., ibid, 642–656). Van Halsema et al., Antibiotics Annual, 1955–1956, pages 418–421, report that oral administration of calcium tetracycline to rats and rabbits produces blood levels of tetracycline very markedly lower than those produced by tetracycline hydrochloride. Kiser and Roberts, in United States Patent 2,806,789, disclose that the blood levels of tetracycline obtained by the administration to chickens of feeds containing tetracycline hydrochloride are greatly increased when the feed contains less than 0.35% calcium instead of the usual content of 2.2% calcium. Buckwalter et al. (U.S. Patent 2,795,528) and later Welch et al., e.g. Antibiotic Medicine and Clinical Therapy, IV (10), 620–626, 1957, and references therein, found in dogs and man that the addition of sodium hexametaphosphate to capsules of tetracycline hydrochloride increased the blood levels of tetracycline obtained on oral administration and the latter theorized that this result was to be attributed to the known ability of these additives to sequester calcium ions; Welch also obtained about the same result with citric acid.

In view of the above, it is surprising that the objects of the present invention have been attained by the provision of a composition providing adequate blood levels of tetracycline on oral administration in the form of a true aqueous solution of tetracycline comprising amphoteric tetracycline in a concentration in the range of 25 to 100 mg./ml. and calcium hydroxide in a molar ratio to the tetracycline of 0.7 to 1.0, said solution having a pH in the range of 9 to 11 and containing substantially no inorganic anions and preferable but not necessarily also containing, per milliliter, at least 5, usually from 5 to 40 and preferably about 10, milligrams of a nontoxic complex phosphate, including particularly a nontoxic hexametaphosphate such as sodium, potassium or ammonium hexametaphosphate or the same amount of a nontoxic salt of a polyimidophosphate or 20 to 40 percent by weight of sorbitol or both.

Thus, a preferred embodiment of the present invention is a therapeutic composition of tetracycline in the form of a true aqueous solution of tetracycline providing adequate blood levels upon oral administration and comprising amphoteric tetracycline, in a concentration in the range of 25 to 100 mgm./ml., and calcium hydroxide in a molar ratio to the tetracycline of 0.7 to 1.0, said solution containing substantially no inorganic anions, having a pH in the range of 9 to 11 and containing per ml. 5 to 40 mgms. of a nontoxic complex phosphate.

A narrower group of preferred embodiments of the present invention consists of formulations which may be defined as being each a therapeutic composition of tetracycline in the form of a true aqueous solution of tetracycline providing adequate blood levels upon oral administration and comprising amphoteric tetracycline, in a concentration in the range of 25 to 100 mgm./ml., and calcium hydroxide in a molar ratio to the tetracycline of 0.7 to 1.0, said solution containing substantially no inorganic anions, having a pH in the range of 9 to 11 and containing per ml. from 5 to 40 mgms. of a member selected from the group consisting of nontoxic hexametaphosphates and nontoxic polyimdophosphates.

The term complex phophate includes polyimdophosphates, hexametaphosphates, tripolyphosphates, tetrametaphosphates, trimetaphosphates, polymetaphosphates, pyrophosphates and all inorganic phosphates other than orthophosphates. There are thus included in these complex phosphates and those phosphate compounds which inherently have, when in the the form of the sodium salt thereof, an $Na_2O:P_2O_5$ ratio of from 1.0 to 2.0 inclusive, as is evident from page 404 of volume X of the Encyclopedia of Chemical Technology, published in 1953, by the Interscience Encyclopedia, Inc. These must, of course, be supplied in combination with the cation and use is made of any nontoxic cation. Naturally, the most satisfactory and most readily available compounds are the sodium, potassium and ammonium salts of these complex phosphates.

Among the nontoxic salts of a polyimidophosphate including the preferred amonium salt of polyimidophosphate, which are used in the compositions of the present invention are those described in U.S. Patent 2,122,122. Thus, the ammonium salt of polyimidophosphate used in each of the working examples below has a typical analysis as follows:

Particle size practicaly all less than 5 microns
$P_2O_5$: 76.1%
$NH_3$: 22.4% (total); 15.4% (free)
Amide N as $NH_3$: 7.0%
pH (1% solution): 5.6
Apparent density: 30 pounds per cubic foot (approximate)

The ammonium salt of polyimidophosphate is thus a compound essentially of a nitrogen phosphorus complex resulting from heating a reaction product of P$_2$O$_5$ and anhydrous ammonia at a temperature of at least about 150° C. in the presence of anhydrous ammonia to produce a condensation reaction in which ammonia is lost by the heated product, the heating being continued until the product has an atomic ratio of nitrogen to phosphorus of less than 1.5 to 1. It is preferred that this ratio be less than 1.25 to 1 and even more preferable less than 1.2 to 1.

Use may be made of other nontoxic salts of a polyimidophosphate disclosed in U.S. Patent 2,122,122, such as the alkali metal salts including potassium and sodium.

The complex phosphate serves its known function of increasing the blood levels of these tetracycline compositions on oral administration but it is quite surprising that it does not interfere with the formation of a true solution because a suspension rather than a true solution is obtained when the formulation contains citrate, tartrate, chloride, sulfate or other inorganic anions. The mechanism of the formation of true solutions of tetracycline by the admixture in the specified ratio of the basic ingredients of applicants' invention is a matter of theory and is not essential to the present invention; however, it is quite surprising in view of the known instability in water of amphoteric tetracycline at pH 9 to 11 and in view of the fact that it is impossible to convert aqueous suspensions of amphoteric tetracycline to such a true solution by the addition of sodium citrate or sodium tartrate.

The statement that solutions of applicants' invention are stable refers both to the fact that on standing they do not lose their antibacterial activity by any mechanism including the formation of epitetracycline and to the fact that on standing precipitation, as of amphoteric tetracycline, does not occur.

It is further essential that the pH of these solutions be adjusted to the range of 9–11, and preferably to the range of pH 9–10, e.g. most simply by the addition of sodium hydroxide.

In one of the preferred embodiments of applicants' invention use is made of 30 to 150 mgm., and preferably about 70 mgm., per milliliter of fructose in order to prevent the development of a black color on standing. The activity of the fructose in this respect is superior to that of the bisulfite ion previously used in tetracycline suspensions and this in itself was quite unexpected and is an activity not exhibited by other common sweetening agents such as sucrose and sorbitol. Although advantageous, this use of fructose is not essential to the present invention because the development of this black color can be avoided by the use of other more cumbersome procedures, such as storage in dark brown bottles in an atmosphere of nitrogen.

In the formulations of the present invention, use may be made, if desired, of certain other materials commonly added to increase the elegance of products designed for oral administration, e.g. sweetening agents such as sodium saccharin, sucrose or sorbitol, dyes, flavors and preservatives such as methyl Paraben and propyl Paraben.

In a typical procedure for preparing 60 cc. compositions of the present invention, 100 mgm. sodium saccharin, 50 mgm. methyl Paraben, 12 mgm. propyl Paraben, 0.1 ml. fruit flavor, 300 to 1200 mgms. sodium hexametaphosphate and 4 g. fructose are dissolved in 20 cc. water. Calcium hydroxide (152–217 mgm.) is then added with stirring to give a solution whose pH is kept in the range of 9.5 to 11 by the addition of sodium hydroxide. Solid amphoteric tetracycline trihydrate (1.5 g.) is added and the pH is adjusted to 9 to 11, and preferably 9–10, by addition of sodium hydroxide. Finally, the sugar is added, e.g. 20 g. sucrose or sorbitol, and water q.s. ad 60 cc.

True solutions were not obtained when the compositions contained sodium Sucaryl, ethylenediaminetetraacetic acid (Versene), citrate, tartrate, sulfate or chloride ions or when the pH of the final product was less than 9 or when use was made of buffers other than calcium hydroxide.

The complex phosphate is preferably used in an amount equal to about 80 percent of the weight of the tetracycline up to a maximum concentration of the complex phosphate of 40 mgm./ml.

A more comprehensive understanding of this invention is obtained by reference to the following examples, which are illustrative only and are not the exclusive embodiment of the invention.

Example 1

Flavoring (3.0 ml. fruit flavor), 360 g. fructose and 3.0 g. saccharin were mixed in 1800 ml. water and 8.0 g. calcium hydroxide was added to this solution. After the addition of 54.0 g. amphoteric tetracycline trihydrate, the pH was adjusted to 10.0 by the addition of 20% aqueous sodium hydroxide. Sucrose (360 g.) was then added and the pH was readjusted with 20% aqueous sodium hydroxide (making a total of 15 ml.) to 9.9. Dye (750 mg. F.D. and C. Red #1) was added to this solution. The product was a stable aqueous solution of about 30 mgm./ml. tetracycline which gave therapeutic blood levels of tetracycline upon oral administration of a single dose of one teaspoonful (5 cc.) to ten patients.

Example 2

Flavor (3.0 ml.), 150 g. fructose, and 3.0 g. sodium saccharin were mixed together in 1800 ml. water and 8.1 g. calcium hydroxide was added to this solution. The solution was adjusted to pH 10.0 by the addition of 20% aqueous sodium hydroxide after adding 54.0 g. amphoteric tetracycline trihydrate. There was then added 570 g. sucrose and 43.2 g. sodium hexametaphosphate. The pH was readjusted with 20% aqueous sodium hydroxide to about 9.9. The product was a stable aqueous solution of about 30 mgm./ml. tetracycline which gave high blood levels of tetracycline upon oral administration of a single dose of one teaspoonful (5 cc.) to ten patients.

Example 3

Flavor (3.0 ml.) and color (750 mgm. F.D. and C. Red #1) were mixed together in 600 ml. water and 8.1 g. calcium hydroxide was added to this solution. The solution was adjusted to pH 10.0 by the addition of 11.5 ml. 20% NaOH after adding 54.0 g. amphoteric tetracycline trihydrate. There was then added 900 ml. of 70% sorbitol (e.g. 0.33 g. sorbitol per ml.) and water q.s. ad 1800 ml. The product was a stable aqueous solution of about 30 mgm./ml. tetracycline which gave high blood levels of tetracycline upon oral administration of a single dose of one teaspoonful (5 cc.) to ten patients.

Example 4

Following the procedure of Example 1 an aqueous formulation was prepared containing in each 60 cc. 12 g. glucose, 12 g. sucrose, 0.05 g. methyl Paraben, 0.012 g. propyl Paraben, 1500 mgm. amphoteric tetracycline and 225 mgm. calcium hydroxide and 1200 mgm. ammonium polyimidophosphate (Victamide) and adjusted to pH 10 with sodium hydroxide. The product was a stable aqueous solution of about 25 mgm./ml. tetracycline which gave high blood levels of tetracycline upon oral administration to dogs of a single dose of 12.5 mgm. tetracycline hydrochloride equivalents per kilogram.

Example 5

A formulation was prepared in an aqueous solution containing 35% sorbitol by weight containing per 60 cc. 0.05 g. methyl Paraben, 0.012 g. propyl Paraben, 1500 mgm. amphoteric tetracycline and 225 mgm. calcium hydroxide and 1500 mgm. fructose, all adjusted to pH 9.5. The product was a stable aqueous solution of about 25 mgm./ml. tetracycline which gave high blood levels of tetracycline upon oral administration to dogs of a single dose of 12.5 mgm. tetracycline hydrochloride equivalents per kilogram.

*Example 6*

The formulation of Example 5 was repeated with the addition thereto of 1200 mgm. ammonium polyimidophosphate (Victamide). The product was a stable aqueous solution of about 25 mgm./ml. tetracycline which gave high blood levels of tetracycline upon oral administration to dogs of a single dose of 12.5 mgm. tetracycline hydrochloride equivalents per kilogram.

*Example 7*

The formulation of Example 5 was repeated with the addition thereto of 600 mgm. ammonium polyimidophosphate (Victamide). The product was a stable aqueous solution of about 25 mgm./ml. tetracycline which gave high blood levels of tetracycline upon oral administration to dogs of a single dose of 12.5 mgm. tetracycline hydrochloride equivalents per kilogram.

*Example 8*

A solution was prepared according to the procedure of Example 1 containing in each 60 cc. 100 mgm. saccharin, 50 mgm. methyl Paraben, 12 mgm. propyl Paraben, 4 g. fructose, 20 g. sucrose, 4 g. N-methyl-glucamine, and 1200 mgm. sodium hexametaphosphate, all adjusted to pH 9.8. The product was a stable aqueous solution of about 25 mgm./ml. tetracycline which gave high blood levels of tetracycline upon oral administration to dogs of a single dose of 12.5 mgm. tetracycline hydrochloride equivalents per kilogram.

*Example 9*

Following the procedure of Example 1, 1200 mls. of an aqueous solution were prepared to contain 240 g. fructose, 240 g. sucrose, 2.0 ml. flavor, 0.5 g. dye, 30.0 g. amphoteric tetracycline, 4.5 g. calcium hydroxide, and 6.0 g. sodium hexametaphosphate (5 mgm./ml. Calgon).

*Example 10*

The procedure of Example 9 was repeated using 10, 15 and 20 mgm./ml. sodium hexametaphosphate to obtain stable solutions which gave increasingly higher blood levels upon oral administration to dogs.

We claim:
1. A therapeutic composition of tetracycline in the form of a true aqueous solution of tetracycline providing adequate blood levels upon oral administration and comprising amphoteric tetracycline, in a concentration in the range of 25 to 100 mgm./ml., and calcium hydroxide in a molar ratio to the tetracycline of 0.7 to 1.0, said solution containing substantially no inorganic anions and having a pH in the range of 9 to 11.
2. A therapeutic composition of tetracycline in the form of a true aqueous solution of tetracycline providing adequate blood levels upon oral administration and comprising amphoteric tetracycline, in a concentration in the range of 25 to 100 mgm./ml., and calcium hydroxide in a molar ratio to the tetracycline of 0.7 to 1.0, said solution containing substantially no inorganic anions, having a pH in the range of 9 to 11 and containing 20 to 40 percent by weight of sorbitol.

References Cited in the file of this patent

UNITED STATES PATENTS

| | | |
|---|---|---|
| 2,699,054 | Conover | Jan. 11, 1955 |
| 2,736,725 | Ritter | Feb. 28, 1956 |
| 2,791,609 | Kaplan | May 7, 1957 |
| 2,795,528 | Buckwalter et al. | June 11, 1957 |
| 2,903,395 | Salivar | Sept. 8, 1959 |
| 2,917,517 | Rosenberg | Dec. 15, 1959 |
| 3,017,323 | Gordon et al. | Jan. 16, 1962 |

FOREIGN PATENTS

| | | |
|---|---|---|
| 720,477 | Great Britain | Dec. 22, 1954 |

OTHER REFERENCES

"The Use of Imidoyl Phosphates as Intermediates in the Synthesis of Pyrophosphates," in Chemistry and Industry (Great Britain), September 17, 1955, pp. 1183–84, No. 38, British patent applications Nos. 31,958/53, 12,716/55.

Boger et al.: An Evaluation of Tetracycline Preparations, New England J. of Medicine, vol. 261, No. 17, October 22, 1959, pp. 827–832.